United States Patent
Deck

(10) Patent No.: US 9,435,369 B2
(45) Date of Patent: Sep. 6, 2016

(54) APPARATUS, SYSTEM, AND METHOD FOR RETAINING A NUT ELEMENT TO A PART

(71) Applicant: The Boeing Company, Chicago, IL (US)

(72) Inventor: Eric E. Deck, Saint Louis, MO (US)

(73) Assignee: The Boeing Company, Chicago, IL (US)

( * ) Notice: Subject to any disclaimer, the term of this patent is extended or adjusted under 35 U.S.C. 154(b) by 47 days.

(21) Appl. No.: 14/496,644

(22) Filed: Sep. 25, 2014

(65) Prior Publication Data

US 2016/0091011 A1    Mar. 31, 2016

(51) Int. Cl.
*F16B 39/284*    (2006.01)
*F16B 39/24*    (2006.01)

(52) U.S. Cl.
CPC .................................... *F16B 39/24* (2013.01)

(58) Field of Classification Search
CPC .... F16B 37/04; F16B 37/043; F16B 37/044; F16B 37/046; F16B 37/284; F16B 39/284
USPC .................. 411/103, 107–110, 111, 112, 113
See application file for complete search history.

(56) References Cited

U.S. PATENT DOCUMENTS

| | | | | |
|---|---|---|---|---|
| 2,409,209 A * | 10/1946 | Johnson | ................ | F16B 37/044 411/111 |
| 3,219,086 A * | 11/1965 | Zahodiakin | ........... | F16B 37/044 411/112 |
| 4,193,435 A * | 3/1980 | Frosch | ................ | F16B 37/044 411/103 |
| 4,643,610 A * | 2/1987 | Bien | ................ | F16B 37/043 403/326 |
| 4,875,816 A * | 10/1989 | Peterson | ............... | F16B 37/043 411/104 |
| 5,022,804 A * | 6/1991 | Peterson | ............... | F16B 37/044 403/21 |
| 5,193,643 A * | 3/1993 | McIntyre | ............... | B60G 99/00 180/312 |
| 6,796,760 B1 * | 9/2004 | Tanner | ................ | F16B 41/002 411/104 |
| 6,811,363 B1 * | 11/2004 | Minnich | ............... | F16B 37/044 411/104 |
| 8,177,466 B2 * | 5/2012 | Csik | ...................... | F16B 37/043 411/174 |
| 8,277,158 B2 * | 10/2012 | Csik | ...................... | F16B 37/046 411/111 |
| 8,353,649 B2 * | 1/2013 | Csik | ...................... | F16B 37/045 411/108 |
| 2010/0034612 A1 * | 2/2010 | Pau | ...................... | F16B 37/044 411/108 |

* cited by examiner

*Primary Examiner* — Roberta Delisle

(74) *Attorney, Agent, or Firm* — Kunzler Law Group, PC

(57) ABSTRACT

Described herein is an apparatus that includes a surface. The apparatus also includes a stop, deformable lock, first retainer, and second retainer coupled to the surface. The deformable lock is spaced apart from the stop in a first direction. The first retainer includes a first overhang. The second retainer includes a second overhang, and the second retainer is spaced apart from the first retainer in a second direction perpendicular to the first direction.

20 Claims, 9 Drawing Sheets

APPARATUS, SYSTEM, AND METHOD FOR RETAINING A NUT ELEMENT TO A PART

FIELD

This disclosure relates generally to the assembly of a part, and more particularly to facilitating the coupling of a component to the part.

BACKGROUND

Commonly, a component is coupled to a wall of a part using a nut and bolt arrangement. The nut is positioned on one side of the part. The bolt is extended through both the component and part, from the opposite side of the part, to engage the nut. The bolt engages the nut by rotating the bolt relative to the nut. Relative rotation of the bolt and nut continues until the component and part are effectively clamped between the bolt and nut.

To facilitate relative rotation of the nut and bolt, the nut is held in place while the bolt is rotated. The nut can be manually held in place by an operator through use of a tool. Optionally, the nut is mechanically held in place by permanently fastening, bonding, or adhering the nut to the part.

SUMMARY

The subject matter of the present application has been developed in response to the present state of the art, and in particular, in response to shortcomings of conventional nut and bolt arrangements for coupling a component to a part. One such shortcoming includes the need to access and manually hold the nut in place while turning the bolt. Often, accessing a nut with a manual tool during assembly of the part can be difficult and time-consuming. Another shortcoming includes the added weight, cost, and complexity associated with mechanically and permanently attaching a nut, such as a nut plate, to a part.

The subject matter of the present application has been developed to provide an apparatus, system, and method that overcome at least some of the above-discussed shortcomings of prior art techniques. More particularly, in some embodiments, described herein are an apparatus, a system, and a method for retaining a nut element to a part that does not require manually holding the nut element in place relative to a part or permanently attaching the nut element to the part. Rather, in certain implementations, the part described herein is made with retention features that laterally, transversely, and rotationally retain the nut element to the part before installing a fastener to the nut element, while installing the fastener to the nut element, and while removing the fastener from the nut element. Accordingly, the retention features assist to increase the ease of installing a fastener to a nut element during assembly of a part. Additionally, the retention features can be co-formed together with the part during an additive manufacturing process such that coupling the retention features to the part adds little, or no, cost, time, or complexity to the making of the part. Furthermore, co-forming the retention features with the part reduces the overall weight of the part by reducing or eliminating the need for fasteners, adhesives, and bonding materials in order to couple the retention features to the part.

According to one embodiment, an apparatus includes a surface. The apparatus also includes a stop, deformable lock, first retainer, and second retainer coupled to the surface. The deformable lock is spaced apart from the stop in a first direction. The first retainer includes a first overhang. The second retainer includes a second overhang, and the second retainer is spaced apart from the first retainer in a second direction perpendicular to the first direction.

In some implementations of the apparatus, the deformable lock includes a resiliently deformable element. The stop, first retainer, and second retainer can protrude from the surface. The resiliently deformable element can protrude from the surface in a non-deformed state and is flush with the surface in a deformed state. The apparatus may further include a slot formed in the surface, where the slot extends about and defines a portion of the deformable element.

According to certain implementations of the apparatus, at least one of the stop is integral with the surface, the deformable lock is integral with the surface, the first retainer is integral with the surface, and the second retainer is integral with the surface. In one implementation, the stop is integral with the surface, the deformable lock is integral with the surface, the first retainer is integral with the surface, and the second retainer is integral with the surface.

In certain implementations, the apparatus further includes a nut element that has a base and a fastener receiver coupled to the base. The nut element is non-rotatably coupled to the surface via engagement between the base and the stop, deformable lock, first retainer, and second retainer. The base can include a first notch that receives a portion of the stop and a second notch that receives a portion of the deformable lock. Further, the base may include an outer periphery with a non-round shape, where the outer periphery of the base engages the stop, deformable lock, first retainer, and second retainer. Also, the base can be positioned between the first overhang and the surface, and the second overhang and the surface.

According to some implementations, a first line passing through the stop is parallel to a second line passing through the deformable lock. The first and second lines are parallel to the second direction. The first and second retainers are positioned between the first and second lines.

In another embodiment, a system includes a part with a surface. The system also includes a stop, deformable lock, first retainer, and second retainer coupled to the surface. The deformable lock is spaced apart from the stop in a first direction. The first retainer includes a first overhang. The second retainer includes a second overhang. Also, the second retainer is spaced apart from the first retainer in a second direction perpendicular to the first direction. The system further includes a nut element that has a base and a fastener receiver coupled to the base. The nut element is non-rotatably coupled to the surface via engagement between the base and the stop, deformable lock, first retainer, and second retainer.

In some implementations of the system, the surface of the part is a first surface. The part further includes a second surface opposing the first surface and an aperture that extends between the first and second surfaces of the part. The system further includes a fastener that extends through the aperture and is received by the fastener receiver. The fastener can include a head and a threaded portion. The threaded portion can be received by the fastener receiver and the head directly or indirectly abuts the second surface such that the part is positioned between the head and the nut element.

According to certain implementations of the system, the fastener receiver includes internal threads. The first overhang can define a first channel and the second overhang can define a second channel, where the first channel and second channel are parallel to each other and extend parallel to the first direction. In some implementations, the part, stop, deformable lock, first retainer, and second retainer form a one-piece monolithic construction.

In yet another embodiment, a method includes advancing a nut element over a deformable lock coupled to a part to resiliently deform the deformable lock from a non-deformed state into a deformed state. The method also includes advancing the nut element through respective channels defined between respective overhangs of opposing first and second retainers coupled to the part with the deformable lock in the deformed state. Further, the method includes advancing the nut element past the deformable lock to (i) release the deformable lock from the deformed state back into the non-deformed state; and (ii) engage with the nut element a stop coupled to the part, with the nut element positioned within the respective channels.

Additionally, with the nut element positioned within the respective channels, the method includes preventing advancement of the nut element with the stop, preventing retreat of the nut element with the deformable lock in the non-deformed state, and preventing rotation of the nut element relative to the part with at least one of the deformable lock, opposing first and second retainers, and the stop.

According to some implementations, the method further includes co-forming the part, deformable lock, opposing first and second retainers, and stop using an additive manufacturing process. The method can also include threadably engaging the nut element with a fastener to tighten the nut element against the part.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
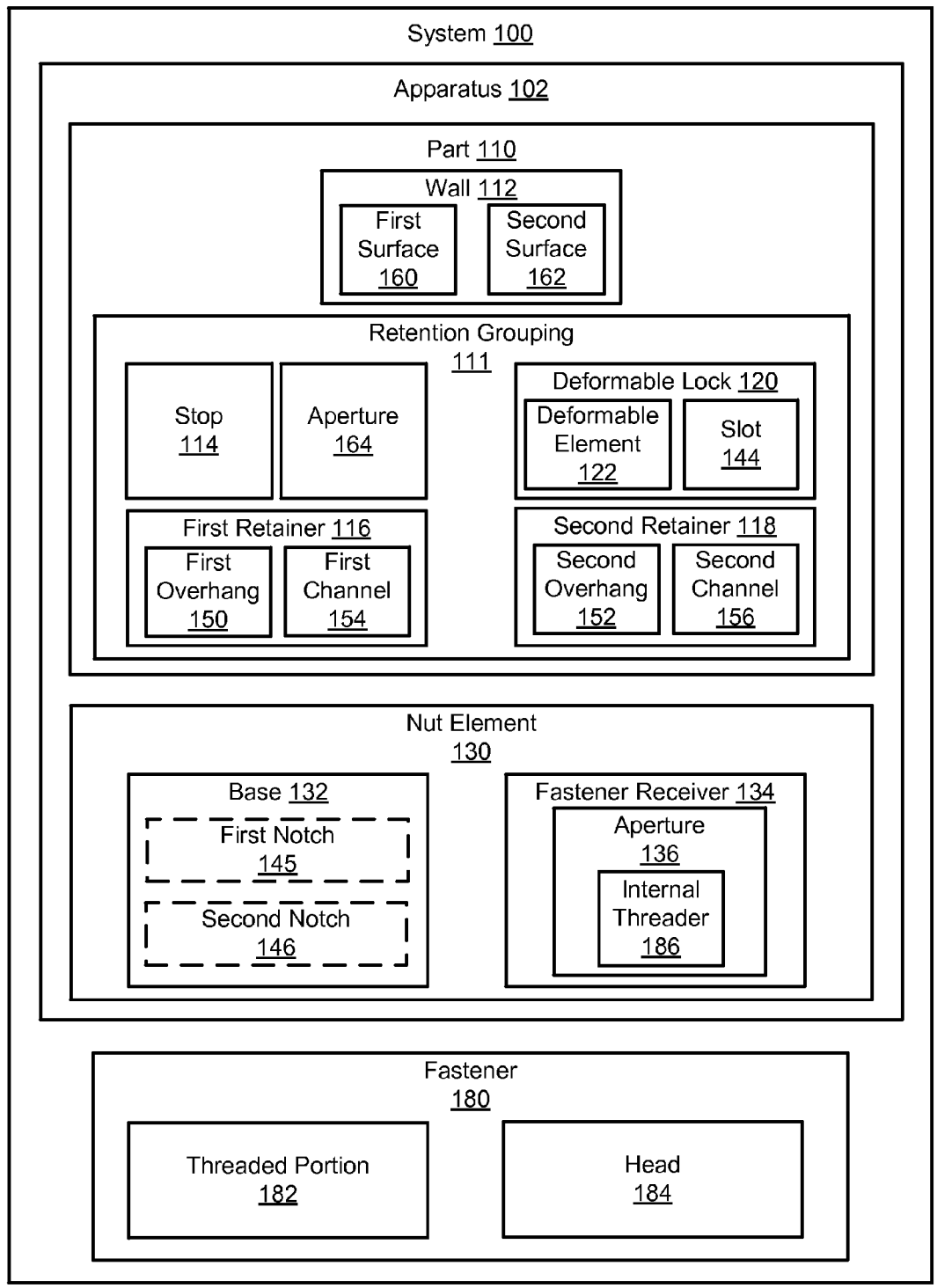
FIG. 1 is a schematic block diagram of a system for retaining a nut element according to one embodiment.

Referring to FIG. 1, and according to one embodiment, a system 100 for retaining a nut element 130 to a part 110 is shown schematically. The system 100 includes an apparatus 102 and a fastener 180. The apparatus 102 includes the part 110 and the nut element 130. The part 110 includes a wall 112 with a first surface 160 and a second surface 162 that opposes the first surface. The first surface 160 can be considered a top surface and the second surface 162 can be considered a bottom surface in some implementations. Additionally, the part 110 includes features coupled to the first surface 160. The features include a stop 114, first retainer 116, second retainer 118, and deformable lock 120.

Generally, the stop 114, first retainer 116, second retainer 118, and deformable lock 120 cooperate to non-rotatably retain the nut element 130 to the first surface 160 of the part 110. The deformable lock 120 has a resiliently deformable element 122 that deforms to allow the nut element 130 to advance through first and second channels 154, 156 defined by respective first and second overhangs 150, 152 of the first and second retainers 116, 118. Additionally, the deformable lock 120 returns to a non-deformed state to retain the nut element 130 between the deformable lock and the stop 114. A portion of the deformable lock 120 may be defined by a slot 144 formed in the wall 112. The first and second overhangs 150, 152 restrict separation of the nut element 130 from the first surface 160 of the part 110. Further, engagement between the nut element 130 and at least one, some, or all of the stop 114, first retainer 116, second retainer 118, and deformable lock 120 restricts rotation of the nut element relative to the first surface 160 of the part 110. A base 132 of the nut element 130 may include first and second notches 145, 148 that engage the deformable lock 120 and stop 114, respectively.

The fastener 180 is used to engage the fastener receiver 134 of the nut element 130 from the second surface 162 of the part 110, which acts to tighten the nut element against the first surface 160 of the part, and tighten the fastener (such as a head 184 of the fastener) against a component 198 to be coupled to the second surface of the part. In one implementation, the fastener receiver 134 of the nut element 130 includes an aperture 136 with internal threads 186 that threadably engage external threads of a threaded portion 182 of the fastener 180. The wall 112 of the part 110 has an aperture 164 through which the threaded portion 182 of the fastener 180 extends. The aperture 164 can have any of various sizes and shapes, such as circular, elongate, ovular, quadrilateral, triangular, and the like. Similarly, the component 198 will have an aperture through which the fastener can extend. The fastener 180 can be any of various types of fasteners, such as screws and bolts.

Figure 2:
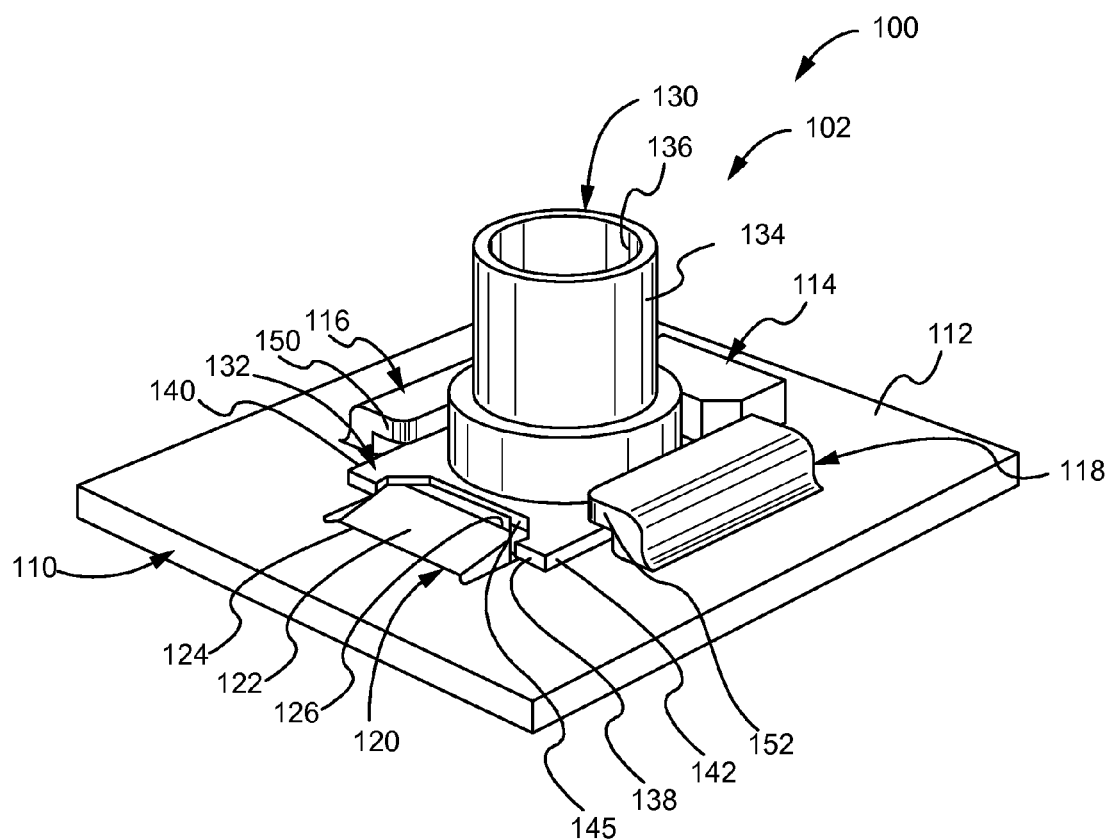
FIG. 2 is a perspective top view of a system for retaining a nut element according to one embodiment.
Figure 3:
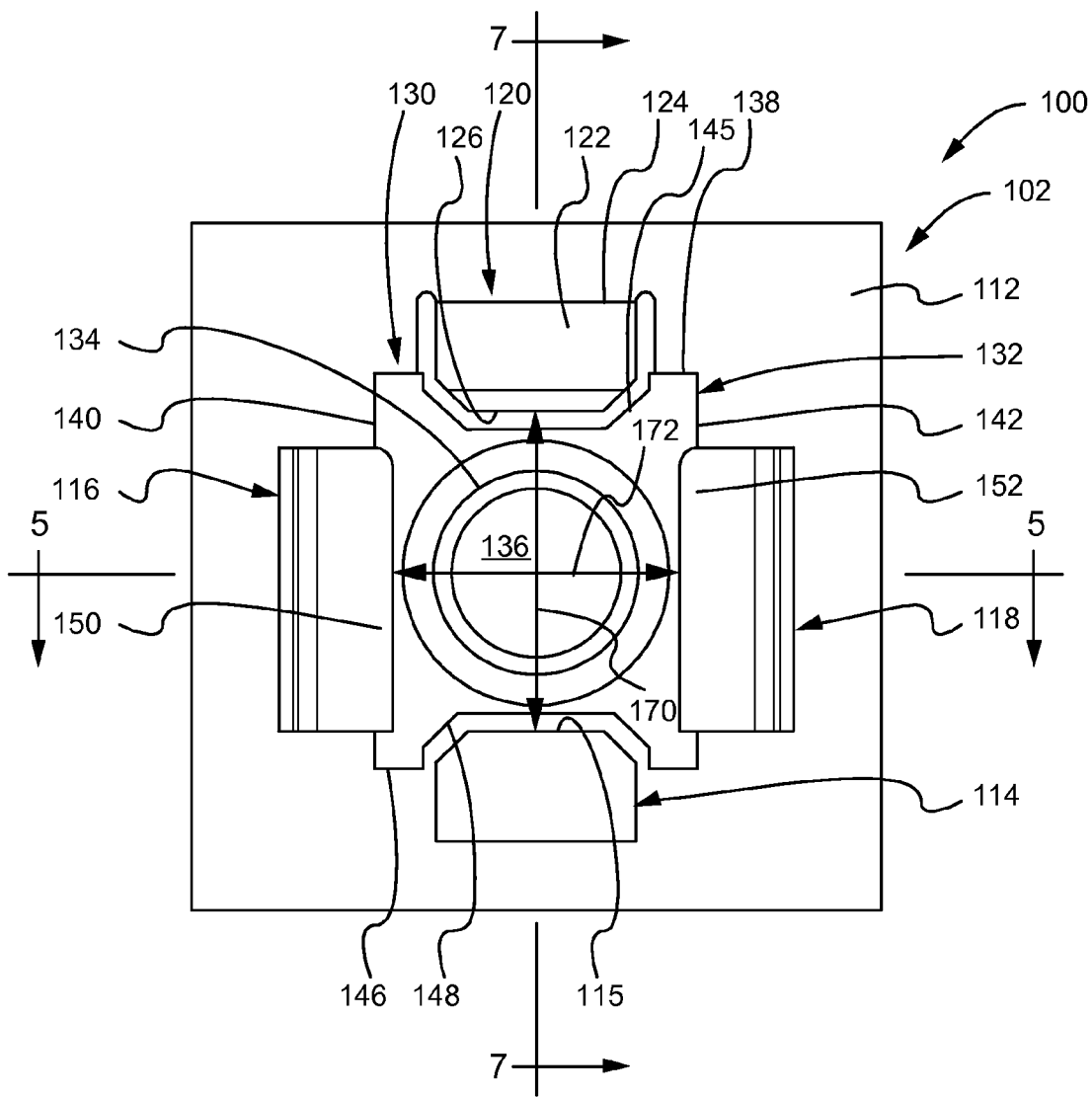
FIG. 3 is a top plan view of the system of FIG. 2.
Figure 4:
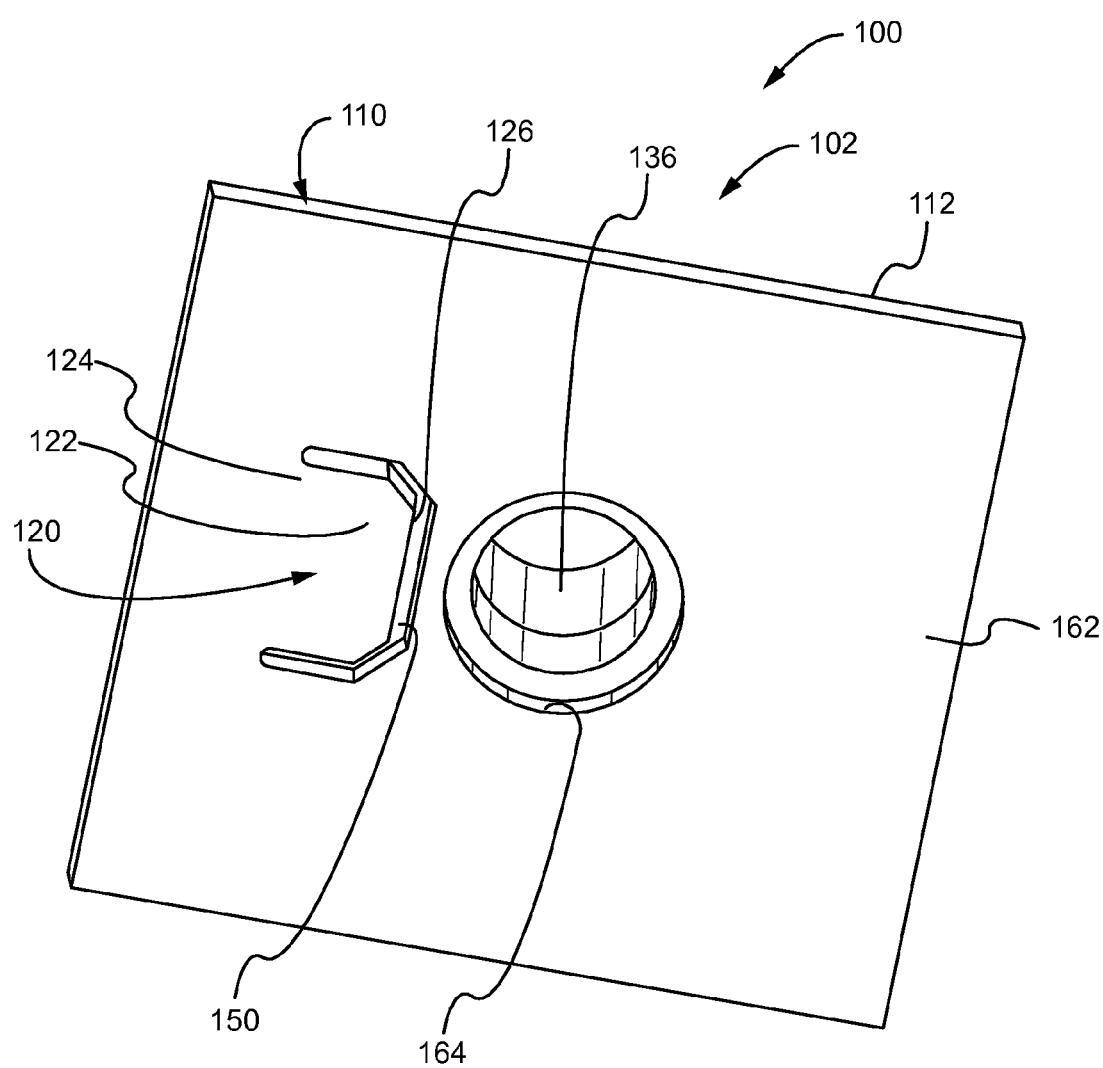
FIG. 4 is a perspective bottom view of the system of FIG. 2.
Figure 5:
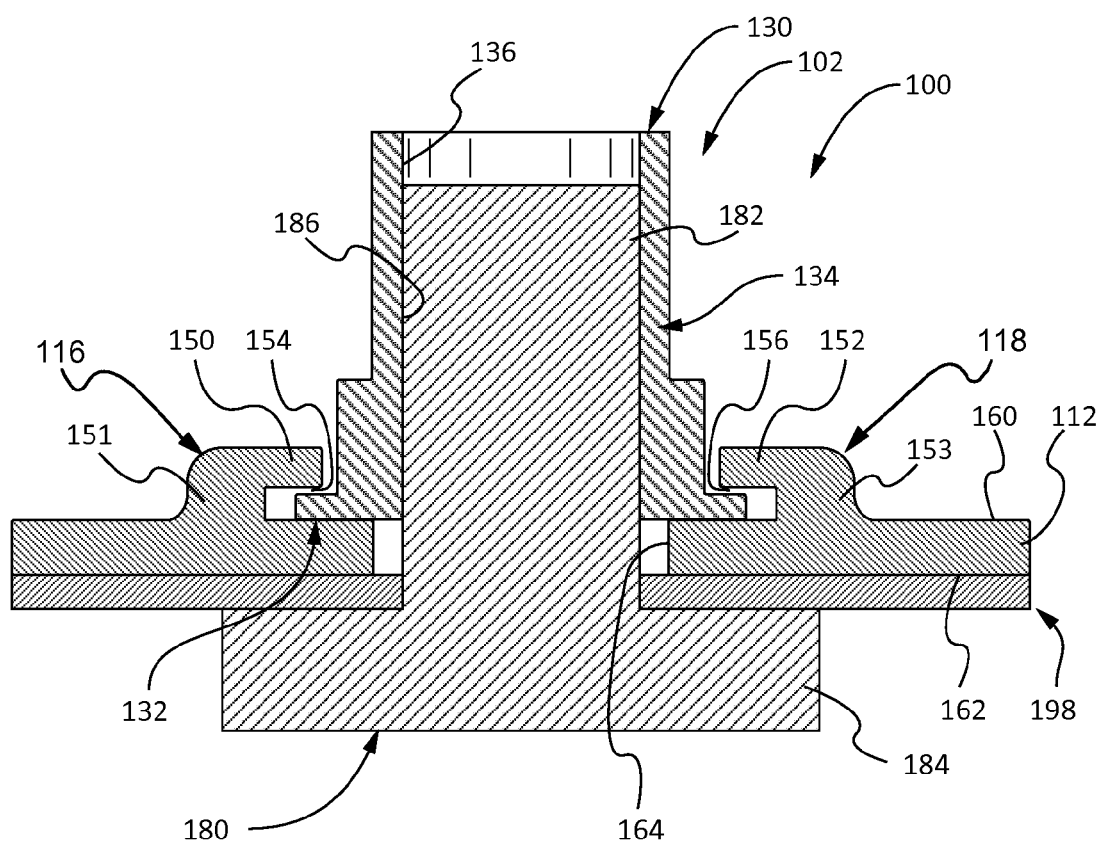
FIG. 5 is a cross-sectional side view of the system of FIG. 2 taken along the line 5-5 of FIG. 3 and shown with a fastener according to one embodiment.

According to one particular embodiment of the system 100 shown in FIGS. 2-8, the wall 112 of the part 110 of the apparatus 102 can have any of various shapes and sizes. Although the wall 112 is shown having a rectangular outer periphery, the wall can have other shaped and sized outer peripheries. In some implementations, the wall 112 depicted in FIG. 2 may represent only a small portion of a larger part 110. The wall 112, as shown in FIGS. 2 and 5, has a thin-walled construction. For example, the thickness of the wall 112, or the distance between the opposing first and second surfaces 160, 162 of the wall 112, is significantly smaller than a length or width of the wall. Further, although the first and second surfaces 160, 162 are shown to be flat, the first and second surfaces can be non-flat, such as having curves, undulations, and the like, depending on the type or application of the part 110.

The stop 114 protrudes away from the first surface 160 of the wall 112. More specifically, stop 114 extends a certain distance transversely away from or above the first surface 160. Accordingly, the stop 114 can be considered to have a height relative to (e.g., above) the first surface 160 of the wall 112. The height of the stop 114 is greater than the thickness of the base 132 of the nut element 130 in some implementations. The stop 114 can have any of various shapes and sizes. For example, as shown in FIG. 3, a receiving portion 115 of the stop 114 that receives the base 132 has tapering side surfaces to form a substantially wedge-shaped outer periphery.

Like the stop 114, the first and second retainers 116, 118 protrude away from the first surface 160 of the wall 112. More specifically, referring to FIG. 5, upright portions 151, 153 of the first and second retainers 116, 118 extend a certain distance transversely away from the first surface 160. The first and second overhangs 150, 152 extend transversely away from the upright portions 151, 153, respectively, at locations away from the first surface 160 of the wall 112 such that a gap is defined between the first and second overhangs and the top surface. The gap defined between the first and second overhangs and the top surface, as constrained by the upright portions 151, 153, form the first and second channels 154, 156, respectively. In other words, the first and second channels 154, 156 are defined as the space between the first surface 160, upright portions 151, 153, and overhangs 150, 152. Generally, the first and second retainers 116, 118 extend linearly and parallel to each other along the first surface 160 in a first direction 170. Therefore, the first and second channels 154, 156 also extend parallel to each other in the first direction 170.

The first and second retainers 116, 118 are spaced-apart from each other in a second direction 172, which is perpendicular to the first direction 170. In other words, the first retainer 116 is positioned across from the second retainer 118 in the second direction 172. The amount of overhang of the overhangs 150, 152 and the spacing between the first and second retainers 116, 118 is such that a minimum distance between the upright portions 151, 153 is greater than a width of the base 132 and a maximum distance between the overhangs 150, 152 is less than a width of the base. However, the distance between the upright portions 151, 153 is smaller than a maximum diagonal dimension of the base 132.

Accordingly, as shown in FIG. 5, the base 132 is insertable into the first and second channels 154, 156, and allowed to slide laterally along the channels and first surface 160 in the first direction 170. In contrast, the upright portions 151, 153 restrict lateral movement of the base 132 in the second direction 172. The distance between the upright portions 151, 153 can be just greater than the width of the base 132 to facilitate a relatively tight fit between the upright portions. However, in some implementations, the distance between the upright portions 151, 153 is sufficiently greater than the width of the base 132 to facilitate a relatively loose fit between the upright portions for allowing some lateral movement or play in the second direction 172. Additionally, because the distance between the upright portions 151, 153 is smaller than a maximum diagonal dimension of the base 132, the upright portions 151, 153 restrict rotation of the base 132 and nut element 130 relative to the first surface 160 of the part 110. In some implementations, such as if the distance between the upright portions 151, 153 is just greater than the width of the base 132, the upright portions effectively prevent any rotation of the base 132. However, in other implementations, such as if the distance between the upright portions 151, 153 is sufficiently greater than the width of the base 132, the upright portions effectively allow some rotation of the base 132, but prevent full rotation of the base 132. As defined herein, a feature of the part 110, such as the first and second channels 154, 156 prevents rotation of the base 132 and nut element 130 when the feature restricts rotation of the base and nut element or prevents full (e.g., 360-degree) rotation of the base and nut element.

The overhangs 150, 152 restrict movement of the base transversely away from the first surface to effectively transversely retain the nut element 130 to the part 110. The gap between the overhangs 150, 152 and the first surface 160 is at least as high as a thickness of the base 132 of the nut element 130 to allow the base to fit within the gap. In some implementations, the fit between the base 132 and the overhangs 150, 152 is tight. However, in other implementations, the fit between the base 132 and the overhangs 150, 152 is loose to allow for some transverse movement (e.g., movement transversely away or towards the surface 160) of the base within the gap.

The width of the base 132 is defined as the distance between opposing first and second sides 140, 142 of the base. In contrast, the length of the base 132 is defined as the distance between opposing first and second ends 138, 146 of the base.

Figure 6:
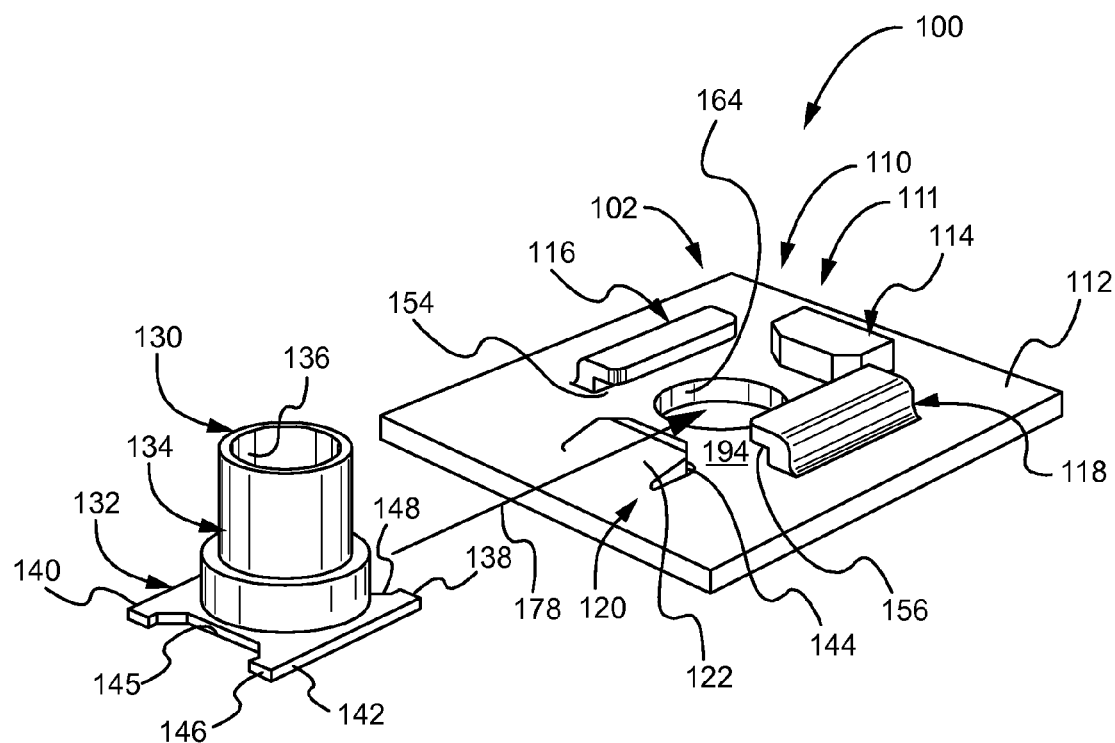
FIG. 6 is a perspective top view of the system of FIG. 2 showing a part separated from a nut element.
Figure 7:
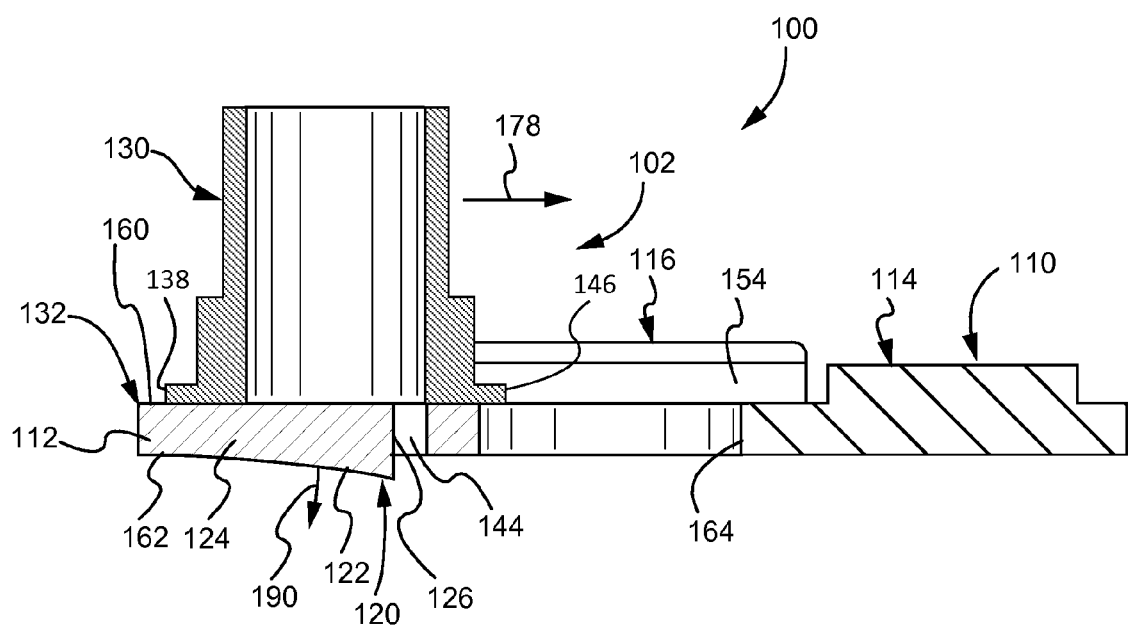
FIG. 7 is a cross-sectional side view of the system of FIG. 2 taken along the line 7-7 of FIG. 3 and showing a nut element in a first position relative to a part.

A portion of the deformable element 122 of the deformable lock 120 protrudes away from or above the first surface 160 of the wall 112 when in a non-deformed state (see, e.g., FIGS. 2, 4, 6, and 8), and is substantially flush or below the first surface of the wall when in a deformed state (see, e.g., FIG. 7). As depicted, the deformable element 122 can be shaped such that in the deformed state, a portion of the deformable element protrudes from the second surface 162. Alternatively, the deformable element 122 can be shaped such that in the deformed state, a portion of the deformable element does not protrude from the second surface 162.

The deformability of the deformable element 122 is facilitated by the slot 144 that extends around a portion of the deformable element to define the portion of the deformable element. Referring to FIG. 4, the slot 144 extends around a substantial portion of the deformable element 122, and entirely through the wall 112, such that the deformable element is cantilevered. More specifically, the deformable element 122 has a fixed end 124 attached to the wall 112, and an opposing free end 126 unattached to the wall. The deformable element 122 can have any of various shapes and sizes. For example, the deformable element 122 may be shaped to have a ramped or angled surface that protrudes from the first surface 160 and is angled upwardly away from the first surface 160 in a direction extending from the fixed end 124 to the free end 126. According to the illustrated implementation, and by example, the free end 126 of the deformable element 122 may have tapering side surfaces to form a substantially wedge-shaped outer periphery.

The material composition and thickness of the fixed end 124 promotes non-permanent deformation of the deformable element 122 at the fixed end when a threshold force is applied to the deformable element. Moreover, because the non-permanent deformation is localized at the fixed end 124, the fixed end can be considered to define a flex axis about which the deformable element 122 rotates under the threshold force. Application of the threshold force and deformation of the fixed end 124 deforms (e.g., changes the shape or size of) the deformable element 122 to place the deformable element from the non-deformed state into the deformed state. Subsequent removal of the threshold force allows the deformable element 122 to return to the non-deformed (e.g., original) state from the deformed state. In some implementations, the elastic properties of the material from which the deformable element 122 is made effectively spring (e.g., snap) the deformable element back to the non-deformed state.

The stop 114 and deformable element 122 are spaced-apart from each other in the first direction 170. In other words, the stop 114 is positioned across from the deformable element 122 in the first direction. The spacing between the stop 114 and the deformable element 122 is such that a minimum distance between the stop and the deformable element is greater than the length of the base 132. However, in some implementations, the distance between the stop 114 and deformable element 122 is smaller than a maximum diagonal dimension of the base 132.

Accordingly, as shown in FIG. 3, the base 132 is positionable between the stop 114 and the deformable element 122. The stop 114 and deformable element 122 restrict lateral movement of the base 132 in the first direction 170. The distance between the stop 114 and the deformable element 122 can be just greater than the length of the base 132 to facilitate a relatively tight fit between the stop and the deformable element. However, in some implementations, the distance between the stop 114 and the deformable element 122 is sufficiently greater than the length of the base 132 to facilitate a relatively loose fit between the stop and the deformable element for allowing some lateral movement or play in the first direction 170. Additionally, because the distance between the stop 114 and the deformable element 122 is smaller than a maximum diagonal dimension of the base 132, the stop and/or deformable element restrict rotation of the base 132 and nut element 130 relative to the first surface 160 of the part 110. In some implementations, such as if the distance between the stop 114 and deformable element 122 is just greater than the length of the base 132, the stop and/or deformable element prevent any rotation of the base 132. However, in other implementations, such as if the distance between the stop 114 and deformable element 122 is sufficiently greater than the length of the base 132, the stop and/or deformable element effectively allow some rotation of the base 132, but prevent full rotation of the base 132.

The stop 114, first retainer 116, second retainer 118, and deformable lock 120 are positioned in relatively close proximity to each other about the first surface 160 of the part 110 to form a retention grouping 111. A space 194 defined between the first surface 160, stop 114, first retainer 116, second retainer 118, and deformable lock 120 receives the base 132 of the nut element 130. As shown, in some embodiments, the stop 114 and deformable lock 120 are positioned between hypothetical lines passing through the first and second retainers 116, 118 that are parallel to the first direction 170. Similarly, in some embodiments, the first and second retainers 116, 118 are positioned between hypothetical lines passing through the stop 114 and deformable lock 120 that are parallel to the second direction.

As show in FIGS. 4-7, the retention grouping 111 includes the aperture 164, which is formed in the portion of the first surface 160 defining the space 194. In other words, the aperture 164 is positioned between the first surface 160, stop 114, first retainer 116, second retainer 118, and deformable lock 120. The aperture 164 extends entirely through the wall 112 from the first surface 160 to the second surface 162. Although one retention grouping 111 is shown coupled to the part 110, the part may include a plurality of retention groupings in some embodiments.

The base 132 of the nut element 130 has a non-circular shaped outer periphery. The outer periphery of the base 132, which can be a thin-walled, plate-like element, is defined by the first side 140, the second side 142, the first end 138, and the second end 146 in the illustrated embodiment. The first and second sides 140, 142 are substantially perpendicular to the first and second ends 138, 146 such that the outer periphery of the base 132 has a substantially quadrilateral shape, such as a rectangle or square. The first notch 145 is formed in the first end 138, and the second notch 148 is formed in the second end 146. The first notch 145 may have the same peripheral shape (e.g., wedge shape) as the free end 126 of the deformable element 122, and the second notch 148 may have the same peripheral shape (e.g., wedge shape) as the receiving portion 115 of the stop 114. In this manner, as shown in the embodiment illustrated in FIG. 3, the first notch 145 may matingly receive the free end 126, and the second notch 148 may matingly receive the receiving portion of the stop 114. Mating engagement between the first and second notches 145, 148 and the free end 126 and receiving portion 115 of the stop 114 facilitate lateral restriction of the base 132 in the first direction 170 and rotational restriction of the base relative to the part 110. According to some embodiments, the base 132 has a non-quadrilateral shape with or without notches.

Figure 8:
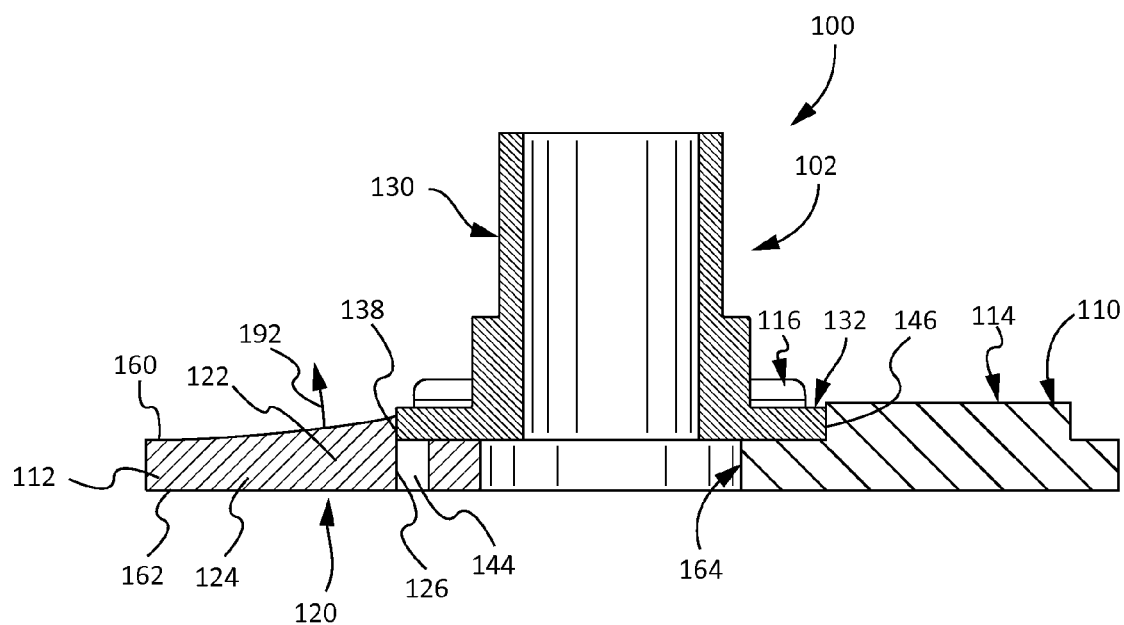
FIG. 8 is a cross-sectional side view of the system of FIG. 2 taken along the line 7-7 of FIG. 3 and showing a nut element in a second position relative to a part.

The fastener receiver 134 extends substantially perpendicularly from the base 132. As shown, the fastener receiver 134 is a substantially tubular element defining a hollow channel or aperture 136. The aperture 136 is sized and shaped to receive a portion of the fastener 180. Therefore, according to one embodiment where the fastener 180 includes the threaded portion 182 and the head 184, the aperture 136 includes internal threads 186 to threadably engage the threaded portion 182. Additionally, although the outer peripheral shape of the fastener receiver 134 is circular in the illustrated embodiments, the outer peripheral shape of the fastener receiver can be any of various shapes. When the nut element 130 is positioned within the space 194 defined by the retention grouping 111, the fastener receiver 134 extends perpendicularly from the first surface 160 of the wall 112. Additionally, as shown in FIGS. 4, 5, and 8, the aperture 136 is coaxially alignable with the aperture 164 when the nut element 130 is positioned within the space 194. According to some implementations allowing some lateral, transverse, and/or rotational movement of the nut element 130 when retained by the retention grouping 111, the nut element can be moved to align the aperture 136 of the nut element with the aperture 164 of the part 110. Alternatively, according to certain implementations where the nut element 130 is tightly retained by the retention grouping 111, alignment of the aperture 136 of the nut element with the aperture 164 of the part 110 is assuredly maintained once the nut element is retained by the retention grouping.

Figure 9:
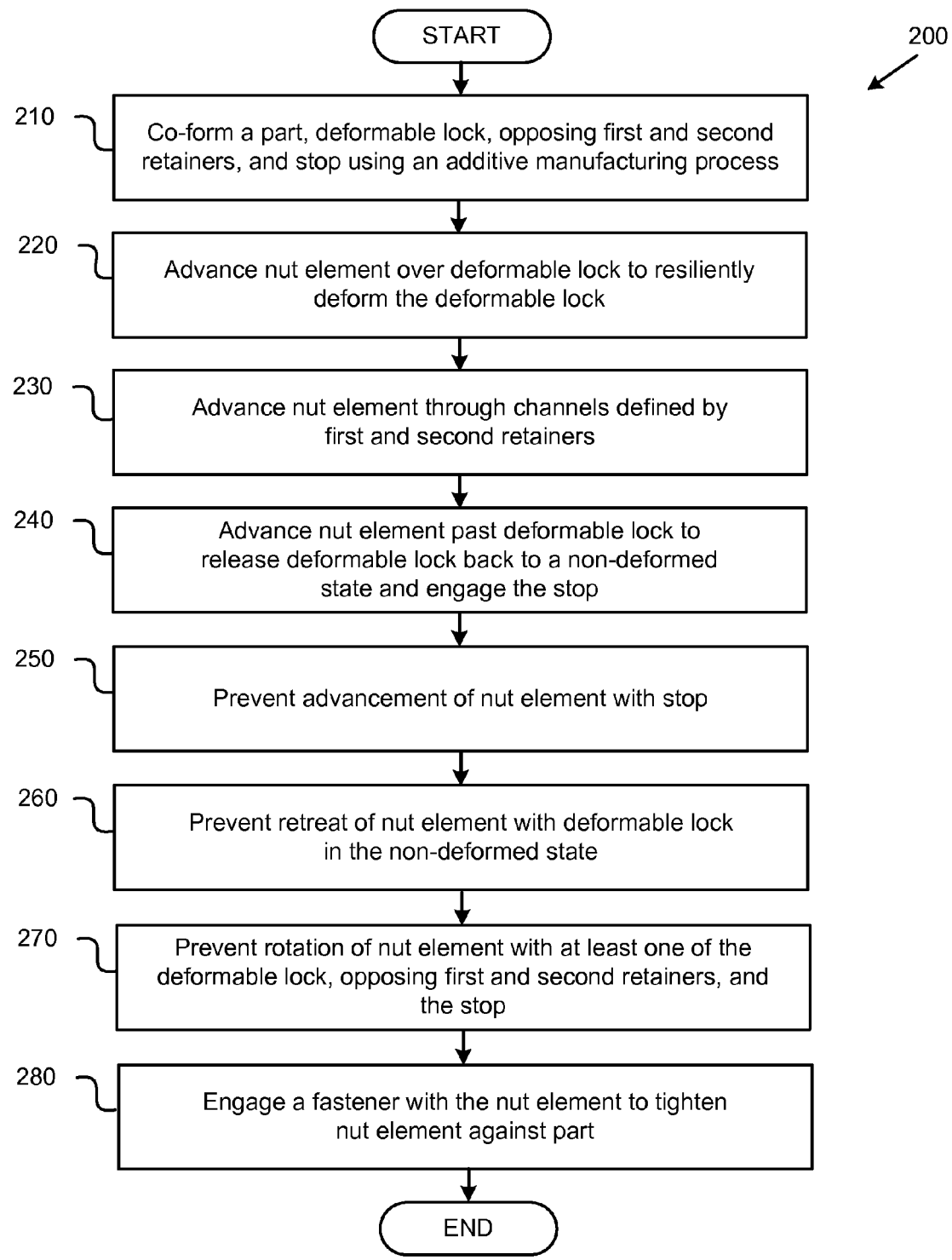
FIG. 9 is a schematic flow diagram of a method for retaining a nut element according to one embodiment.

Referring to FIG. 9, and according to one embodiment, a method 200 for retaining a nut element to a part includes co-forming a part, a deformable lock, opposing first and second retainers, and a stop using an additive manufacturing process at step 210. In one implementation of the step 210, the deformable lock 120, opposing first and second retainers 116, 118, and stop 114 can be formed integral with the part 110. As defined herein, one feature is integral with (or co-formed with) another feature when the features form a one-piece monolithic construction. Additionally, as used herein, a feature can be coupled to another feature by being integrally formed with that feature. The additive manufacturing process of step 210 can be any of various additive manufacturing or 3-dimensional printing processes known in the art, such as extrusion techniques (e.g., fused deposition modeling), wire techniques (e.g., electron beam freeform fabrication), granular techniques (e.g., electron-beam melting, selective laser melting, selective heat sintering, etc.), light polymerized techniques (e.g., stereolithography). Generally, the additive manufacturing process of step 210 can be any manufacturing process that makes a 3-dimensional object through adding successive layers of material together under computer control based on electronic 3-dimensional model data. The material from which the part 110 and features of the retention grouping 111 are made include thermoplastics in some embodiments, and other materials in other embodiments. If desirable, in certain embodiments, the step 210 can be replaced with a step of separately forming the features using any of various manufacturing processes, and subsequently coupling the features together using any of various coupling techniques, such as fastening, adhering, welding, or bonding techniques. Similarly, the step 210 can be replaced with a step of co-forming the part, deformable lock, opposing first and second retainers, and stop using a manufacturing process other than an additive manufacturing process, such as an injection molding process.

The method 200 also includes advancing (e.g., translating) the nut element over the deformable lock to resiliently deform the deformable lock from the non-deformed state to the deformed state at step 220. As shown in FIG. 6, the nut element 130 is advanced in an advancing direction 178 indicated by a directional arrow. The advancing direction 178 can be aligned with the first direction 170. The nut element 130 is advanced in the advancing direction 178, and slides along the first surface 160 in some implementations, until the base 132 contacts the deformable lock 120. Represented in FIG. 7, further advancement of the nut element 130, together with the application on the nut element of a downward force equal to or greater than the threshold force associated with deformation of the deformable element 122, causes the deformable element to deform and move into the wall 112 of the part 110 in a deforming direction 190. In this position, the deformable element 122 is in the deformed state. Advancement of the nut element 130 over the deformable element 122 of the deformable lock 120 can be facilitated by the angled or ramped surface of the deformable element.

Additionally, the method 200 includes advancing the nut element through channels defined by the first and second retainers, while the deformable lock is in the deformed state, at step 230. Referring again to FIG. 7, with the deformable element 122 in the deformed state, the base 132 of the nut element 130 is inserted into and advanced along the channels 154, 156 in the advancing direction 178. The first and second retainers 116, 118 not only transversely retain the nut element 130 to the part 110, but also act as guides to maintain the direction 178 of the nut element as it advances through the first and second channels 154, 156.

The method 200 also includes advancing the nut element past the deformable lock to release the deformable lock back into the non-deformed state, and to engage the stop, while the base is positioned within the channels of the retainers, at step 240. As shown in FIG. 8, once the nut element 130 advances past the deformable element 122, the downward force applied to the nut element is effectively removed from the deformable element. With the downward force removed from the deformable element 122, the resilient or elastic properties of the deformable element moves the deformable element in a retraction direction 192 back into the non-deformed state. The resiliency of the deformable element 122 may be such that the deformable element swiftly snaps back into the non-deformed state when the second end 146 or trailing end of the base 132 passes the free end 126 of the deformable element. Further, as shown, with the second end 146 of the base 132 past the free end 126 of the deformable element 122, and the deformable element returning to the non-deformed state, the first end 138 of the base can engage the stop 114. Also, with the free end 126 protruding from the first surface 160 in the non-deformed state, the free end 126 is free to engage the second end 146 of the base may engage the free end 126.

Furthermore, the method 200 includes preventing advancement of the nut element with the stop at step 250, and preventing retreat of the nut element with the deformable lock in the non-deformed state at step 260. Referring to FIGS. 3 and 8, the stop 114 engages the second end 146 of the base 132 to prevent further advancement of the nut element 130 in the advancing direction 178. Likewise, the protruding portion of the deformable element 122 engages the first end 138 of the base to prevent retreat of the nut element 130 in a retreating direction opposite the advancing direction. Although not shown in FIG. 9, the method 200 may include preventing lateral movement of the nut element with the first and second retainers in directions perpendicular to the advancing direction 178, and preventing transverse movement of the nut element with the first and second retainers. The method 200 additionally includes preventing rotation of the nut element with at least one of the deformable lock, opposing first and second retainers, and the stop at step 270.

In some implementations, the method 200 includes engaging a fastener with the nut element to tighten the nut element against the part at step 280. As shown in FIG. 5, the threaded portion 182 of the fastener 180 is inserted into and through the aperture in the component 198, and the aperture 164 in the wall 112, from the second surface 162, or a side of the part 110 adjacent the second surface. In other words, the threaded portion 182 moves in a direction extending from the second surface 162 to the first surface 160. With the nut element 130 retained on the first surface 160, the threaded portion 182 is insertable through the aperture 164 and into the aperture 136. The external threads of the threaded portion 182 engage the internal threads 186 of the aperture 136 by rotating the fastener 180, including the threaded portion 182, relative to the part 110.

The rotation of the threaded portion 182 while engaging the internal threads of the aperture 136 has a tendency to rotate the nut element 130 via frictional engagement between the threads. However, with the features of the retention grouping 111 preventing rotation of the nut element 130 relative to the part 110, the retention grouping effectively facilitates relative rotation between the threaded portion 182 of the fastener 180 and the nut element. Also, the axially-directed force often applied to the fastener 180 during installation tends to push the nut element 130 transversely away from the first surface 160 of the part 110. However, the first and second overhangs 150, 152 of the first and second retainers 116, 118 restrict transverse movement of the nut element 130 away from the first surface 160. In view of the foregoing, the threaded portion 182 of the fastener 180 is allowed to penetrate the aperture 136 through continuous rotation and threaded engagement with the internal threads 186 until the head 184 of the fastener is secured against the component 198, which is in turn secured against the second surface 162, and the base 132 of the nut element 130 is secured against the first surface 160. In other words, the threaded portion 182 of the fastener 180 is allowed to penetrate the aperture 136 until the wall 112 is clamped between the base 132 and the head 184. Of course, in some implementations, one or more components, such as washers, may be positioned between the base 132 and the first surface 160 of the wall 112, between the head 184 of the fastener 180 and the component 198, or between the component and the second surface 162 of the wall.

Also, although not shown in FIG. 9, the method 200 may include rotating the fastener 180 in an opposite direction to remove the fastener from the part 110 and nut element 130. Like during insertion of the fastener 180 into the part 110 and nut element 130, the features of the retention grouping 111 prevent co-rotation of the nut element and fastener, which facilitates the removal of the fastener from the part and nut element.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An apparatus, comprising:
    a surface;
    a stop coupled to the surface;
    a deformable lock coupled to the surface, the deformable lock being spaced apart from the stop in a first direction;
    a first retainer coupled to the surface, the first retainer comprising a first overhang; and
    a second retainer coupled to the surface, the second retainer comprising a second overhang, wherein the second retainer is spaced apart from the first retainer in a second direction perpendicular to the first direction, wherein the surface encompasses and entirely surrounds an upright portion of each of the first retainer and the second retainer, the first retainer and the second retainer forming a one-piece monolithic construction with the surface.

2. The apparatus of claim 1, wherein the deformable lock comprises a resiliently deformable element.

3. The apparatus of claim 2, wherein the stop, first retainer, and second retainer protrude from the surface, and wherein the resiliently deformable element protrudes from the surface in a non-deformed state and is flush with the surface in a deformed state.

4. The apparatus of claim 2, wherein the deformable lock further comprises a slot formed in the surface, the slot extending about and defining a portion of the resiliently deformable element.

5. The apparatus of claim 1, wherein at least one of the stop is integral with the surface, the deformable lock is integral with the surface, the first retainer is integral with the surface, and the second retainer is integral with the surface.

6. The apparatus of claim 5, wherein the stop is integral with the surface, the deformable lock is integral with the surface, the first retainer is integral with the surface, and the second retainer is integral with the surface.

7. The apparatus of claim 1, further comprising a nut element having a base and a fastener receiver coupled to the base, the nut element being non-rotatably coupled to the surface via engagement between the base and the stop, deformable lock, first retainer, and second retainer.

8. The apparatus of claim 7, wherein the base comprises a first notch that receives a portion of the deformable lock and a second notch that receives a portion of the stop.

9. The apparatus of claim 7, wherein the base has an outer periphery with a non-round shape, the outer periphery of the base engaging the stop, deformable lock, first retainer, and second retainer.

10. The apparatus of claim 7, wherein the base is positioned between the first overhang and the surface, and the second overhang and the surface.

11. The apparatus of claim 1, wherein a first line passing through the stop is parallel to a second line passing through the deformable lock, the first and second lines being parallel to the second direction, and wherein the first and second retainers are positioned between the first and second lines.

12. A system, comprising:
a part comprising a surface;
a stop coupled to the surface;
a deformable lock coupled to the surface, the deformable lock being spaced apart from the stop in a first direction, wherein the deformable lock has a wedge-shaped cross-section along a plane parallel to the first direction and perpendicular to the surface;
a first retainer coupled to the surface, the first retainer comprising a first overhang;
a second retainer coupled to the surface, the second retainer comprising a second overhang, wherein the second retainer is spaced apart from the first retainer in a second direction perpendicular to the first direction; and
a nut element having a base and a fastener receiver coupled to the base, the nut element being non-rotatably coupled to the surface via engagement between the base and the stop, deformable lock, first retainer, and second retainer.

13. The system of claim 12, wherein the surface of the part is a first surface, the part further comprising a second surface opposing the first surface and an aperture extending between the first and second surfaces of the part, the system further comprising a fastener extending through the aperture and received by the fastener receiver.

14. The system of claim 13, wherein the fastener comprises a head and a threaded portion, the threaded portion being received by the fastener receiver and the head directly or indirectly abutting the second surface such that the part is positioned between the head and the nut element.

15. The system of claim 12, wherein the fastener receiver comprises internal threads.

16. The system of claim 12, wherein the first overhang defines a first channel and the second overhang defines a second channel, the first channel and second channel being parallel to each other and extending parallel to the first direction.

17. The system of claim 12, wherein the part, stop, deformable lock, first retainer, and second retainer form a one-piece monolithic construction.

18. A method, comprising:
advancing a nut element along a first surface of a part and over a deformable lock coupled to the part to resiliently deform the deformable lock from a non-deformed state into a deformed state;
with the deformable lock in the deformed state, advancing the nut element through respective channels defined between respective overhangs of opposing first and second retainers coupled to the part;
with the nut element positioned within the respective channels, advancing the nut element past the deformable lock to (i) release the deformable lock from the deformed state back into the non-deformed state; and (ii) engage with the nut element a stop coupled to the part; and
with the nut element positioned within the respective channels, preventing advancement of the nut element with the stop, preventing retreat of the nut element with the deformable lock in the non-deformed state, and preventing rotation of the nut element relative to the part with at least one of the deformable lock, opposing first and second retainers, and the stop:
wherein, in the non-deformed state, the deformable lock protrudes from the first surface of the part and is flush with a second surface of the part, the second surface being opposite the first surface.

19. The method of claim 18, further comprising co-forming the part, deformable lock, opposing first and second retainers, and stop using an additive manufacturing process.

20. The method of claim 18, further comprising threadably engaging the nut element with a fastener to tighten the nut element against the part.

* * * * *